United States Patent [19]

Hisano

[11] Patent Number: 4,961,225
[45] Date of Patent: Oct. 2, 1990

[54] FUZZY DATA COMMUNICATION SYSTEM

[75] Inventor: Atsushi Hisano, Nagaokakyo, Japan

[73] Assignee: Omron Tateisi Electronics Co., Kyoto, Japan

[21] Appl. No.: 413,097

[22] Filed: Sep. 27, 1989

[30] Foreign Application Priority Data

Sep. 29, 1988 [JP] Japan .................. 63-244968

[51] Int. Cl.$^5$ .................. H04K 1/00; G06G 7/00
[52] U.S. Cl. .................. 380/28; 364/513; 364/807; 364/274.6
[58] Field of Search .................. 380/28; 364/513, 807, 364/274.6, 200

[56] References Cited

U.S. PATENT DOCUMENTS

| | | | |
|---|---|---|---|
| 4,694,418 | 9/1987 | Ueno et al. | 364/807 |
| 4,716,540 | 12/1987 | Yamakawa | 364/807 |
| 4,777,585 | 10/1988 | Kokawa et al. | 364/513 |
| 4,837,725 | 6/1989 | Yamakawa | 364/807 |
| 4,839,823 | 6/1989 | Matsumoto | 364/513 |
| 4,860,214 | 8/1989 | Matsuda et al. | 364/513 |
| 4,860,243 | 8/1989 | Ueno et al. | 364/807 |
| 4,875,184 | 10/1989 | Yamakawa | 364/807 |

*Primary Examiner*—Salvatore Cangialosi
*Attorney, Agent, or Firm*—Dickstein, Shapiro & Morin

[57] ABSTRACT

A fuzzy data communication system includes a first fuzzy computer storing fuzzy functions and rules, a transmitter compiling the fuzzy functions and rules stored in the first computer into a message to transmit the message, a receiver receiving the transmitted message to decompile fuzzy functions and rules from the received message, and a second fuzzy computer implementing a fuzzy inference based on the decompiled fuzzy functions and rules.

7 Claims, 4 Drawing Sheets

FUZZY DATA COMMUNICATION SYSTEM

BACKGROUND OF THE INVENTION

1. Field of the Invention

This invention relates to a fuzzy data communication system for sending and receiving fuzzy data such as fuzzy rules and membership functions employed in fuzzy computers or fuzzy controllers.

2. Discussion of the Related Art

Heretofore, there have been proposed a fuzzy controller to be applied to operation or process controlling and a fuzzy computer to implement a fuzzy inference. The respective fuzzy inference units employed in the fuzzy controller or computer store their own fuzzy data (fuzzy rules and membership functions) in accordance with objects of control and inference. Since the conventional fuzzy inference units do not have any means for communicating such fuzzy data though they receive variable inputs and generate outputs of inference results, they have the disadvantage that a plurality of fuzzy controllers including them cannot exchange nor commonly have fuzzy data even if the controllers are designed to control the same object.

SUMMARY OF TINE INVENTION

It is, therefore, a primary object of this invention to provide a fuzzy data communication system for easily transmitting and receiving fuzzy data including fuzzy rules and membership functions.

According to this invention there is provided a fuzzy data communication system including a labeling means for respectively applying labels on membership functions producing output values according to input variables to be compiled, a compiling means for compiling a fuzzy rule into a combination of labels, and a transmitting means for transmitting such labeled and compiled membership functions and such compiled fuzzy rule, whereby fuzzy data employed in a fuzzy inference device can be used in another fuzzy inference device.

BRIEF DESCRIPTION OF THE DRAWINGS

A more detailed description of this invention is hereinafter given with specific reference being made to the following drawings, of which.

DETAILED DESCRIPTION OF THE INVENTION

Figure 1:
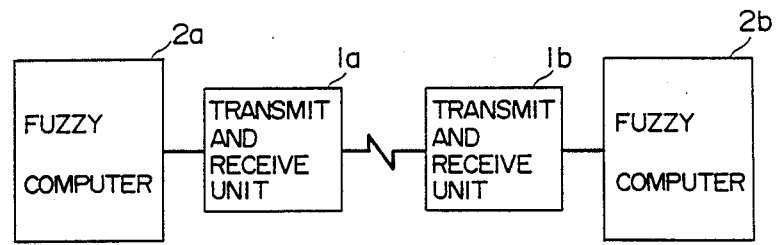
FIG. 1 is a schematic block diagram of a preferred embodiment of a fuzzy data communication system according to this invention.

Referring now to FIG. 1, there is shown a basic construction of a fuzzy data communication system as a preferred embodiment of this invention, in which a plurality of (a pair of) fuzzy computers $2a$ and $2b$ are connected through the respective fuzzy system data transmit-and-receive units $1a$ and $1b$ via a communication line. The fuzzy computers $2a$ and $2b$ may be digital computers implementing a fuzzy inference by programs or sequential digital computers employing analog circuit devices sequentially computing a fuzzy inference. If the digital computers are employed, their interface units with the transmit-and-receive units $1a$ and $1b$ may be parallel interface units by 8 or 16 bits. If the sequential digital computers are employed, their interface units may be the interface serially and time-sequentially sending or receiving data. In the system applying the field of variables and inference values on a plurality of conductive lines each further carrying electronic volume (electronic currents or potentials) representing membership values distributed in a predetermined section, the interface units of the sequential digital computers are designed to be the parallel interface units having the same number of terminals as that of the conductive lines.

Figure 2:
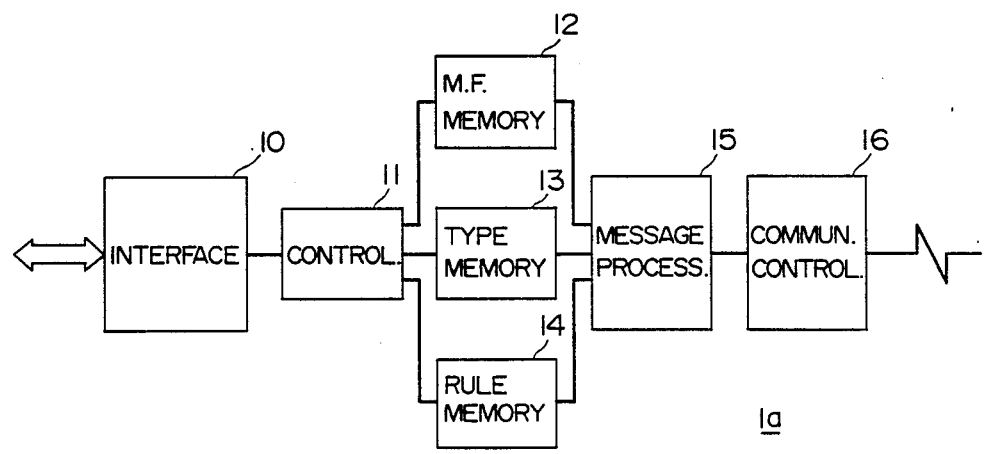
FIG. 2 is a schematic block diagram of a fuzzy system data transmit-and-receive unit employed in the system of FIG. 1.

In FIG. 2 there is shown a construction of the fuzzy system transmit-and-receive unit $1a$. The construction of FIG. 2 is also employed in the unit 1. It is assumed in this embodiment to transfer fuzzy data from computer $2a$ to computer $2b$. An interface 10 conversing data with the computer $2a$ is connected with a controller 11 having a microcomputer for processing data in a digital mode. When the computer $2a$ ($2b$) employs the digital computer, the controller receives the membership functions and fuzzy rules which are stored in the computer by data communication. If the sequential fuzzy computer is employed, the controller catches membership functions in the values obtained from all membership functions entered by variables in all ranges. The controller 11 is further connected with a membership memory 12, and inference operation type memory 13 and a fuzzy rule memory 14 which respectively store the data sent from the fuzzy computer $2a$ or from a message processor 15. The message controller 15 produces a message based on the data stored in memories 12, 13 and 14 and decodes a message received by a communication controller 16 which includes a communication function and an interface function with communication line so as to connect the line of other communication controller 16 of the unit $1b$ requested to receive a message transmitted from the controller 16 or to respond to a call by other controller $1b$ through the line.

Fuzzy inference types mean how logical sum, logical product and so forth are operated, and are defined in this embodiment as the following table:

| TYPE | 1 | 2 | 3 |
|---|---|---|---|
| LOGICAL SUM | $z=\max(x,y)$ | $z=x+y-xy$ | $z=\min(1,x+y)$ |
| LOGICAL PRODUCT | $z=\min(x,y)$ | $z=xy$ | $z=\max(0,x+y-1)$ |
| NEGATION | $z=1-x$ | $z=1-x$ | $z=1-x$ |

Referring to FIGS. 3 to 6, an operation by the fuzzy system data transmit-and-receive unit $1a$ will be explained hereinafter.

Figure 3A:
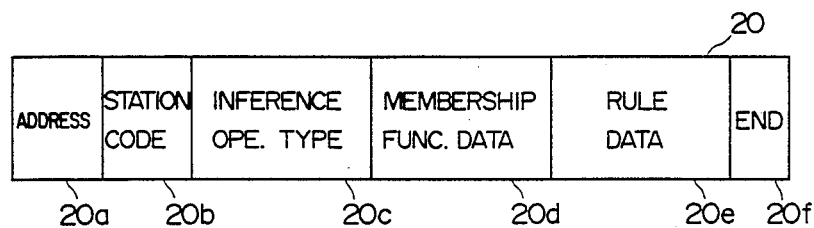
FIG. 3(A), 3(B) and 3(C) illustrates a construction of messages communication in the system.
Figure 3B:
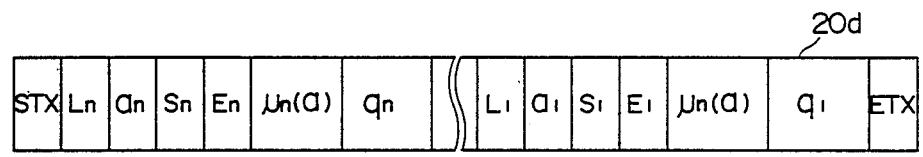
Figure 3C:
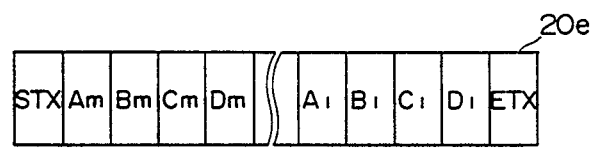
Figure 4:
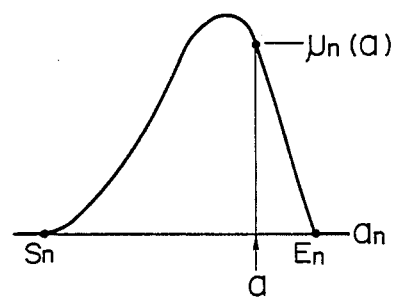
FIG. 4 is a graph illustrating parameters expressing a membership function.
Figure 5:
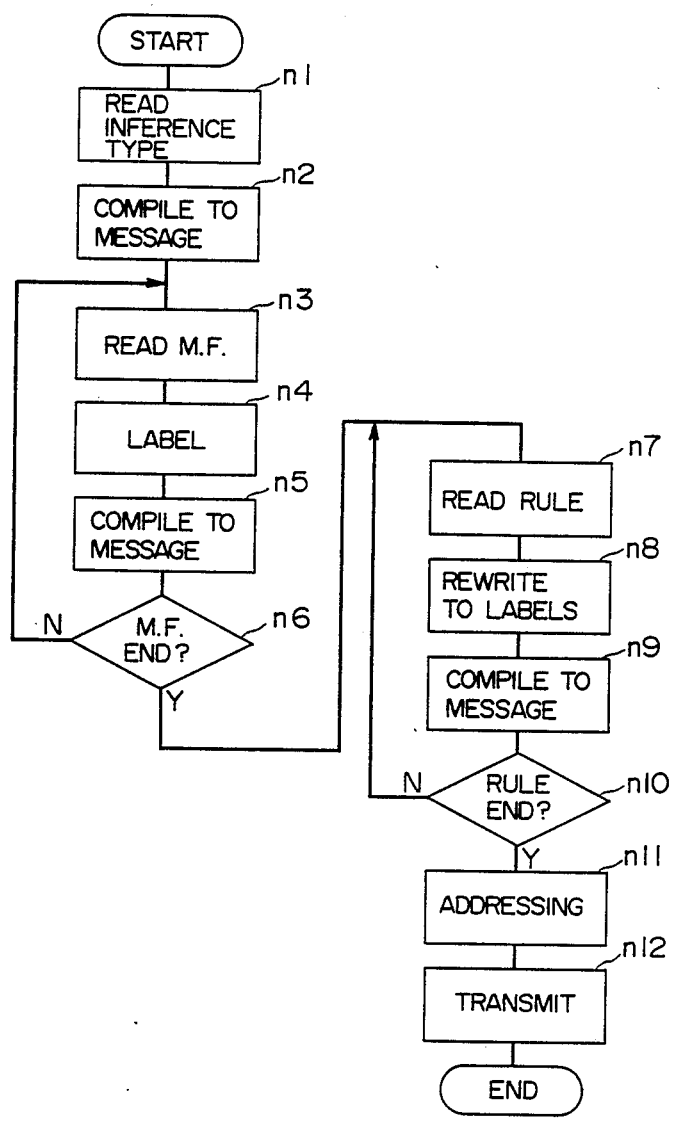
FIG. 5 is a flow chart of a transmitting operation by the system.

FIG. 5 shows a flow chart of a transmitting operation by the message processor 15. Prior to transmitting fuzzy data, the controller 11 reads out fuzzy data from the fuzzy computer $2a$ to be stored into memories 12, 13 and 14 as described above. When fuzzy data is requested to be transmitted, an inference operation type is read out from the inference operation type memory 13 (step n1) and compiled to an inference operation type area $20c$ of a message 20 of FIG. 3(A) (step n2). Next, a membership function is read out from the membership function memory 12 (step n3), and labeled (Ln) to be compiled into a membership function data message area 20d of FIG. 3(A) or (B) (steps n4) and n5). The read out membership function is represented by parameters as shown in FIG. 4 where "$a_n$" is a variable name, "$S_n$" is a starting point of the function, "$E_n$" is an ending point of the function and "$\mu_n(a)$" shows plotting data in variable range. A plurality of $\mu_n(a)$ are stored. A value out of thus defined fuction is represented by "$g_n$". *Thus, the membership functions are compiled into the message area* 20d of FIG. 3(A), and the steps n3 to n5 are repeated until all membership functions are completed to be compiled. After completion of the compilation (step n6), a fuzzy rule is read out from the fuzzy rule memory 14 (step n7). The fuzzy rule is expressed by a proposition "if A∩B∪C then D" where A, B, C and D are membership functions having variables specified. Accordingly, the fuzzy rule can be expressed by parameters having A through D as labels of the membership functions. Thus, the read out fuzzy rule is rewritten into a combination of labels (step n8), and compiled into a rule data message area 20e of FIG. 3(A) or 3(C) (step n9). Until all fuzzy rules are completed to be rewritten and compiled into the message area 20e, the steps n7 to n9 are repeated. Upon the completion, the sequence moves from step n10 to step n11 where the whole message 20 of FIG. 3(A) is completed by adding an address and so forth therein. The message 20 of FIG. 3(A) includes the message areas 20d of FIG. 3(B) and 20e of FIG. 3(C). Then, in step n12, the complete message 20 is transmitted to the station (1b and 2b) designated by the station code area 20b of FIG. 3(A).

Figure 6:
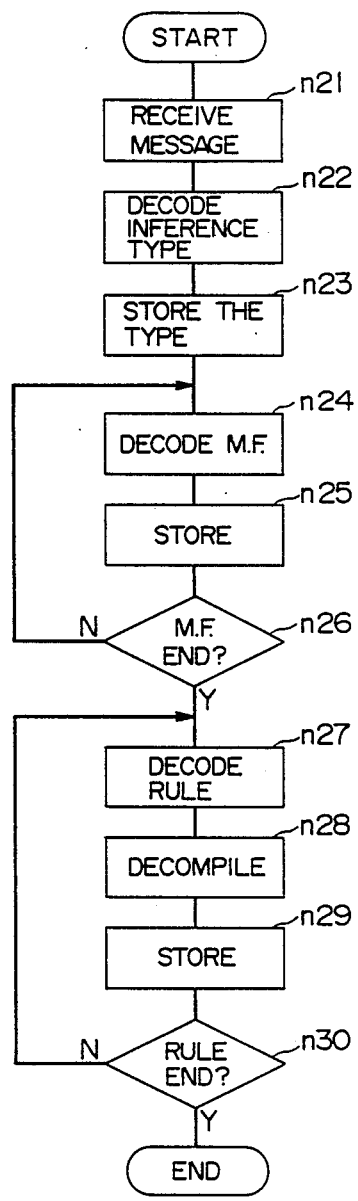
FIG. 6 is a flow chart of a receiving operation by the system.

FIG. 6 shows a receiving operation by the fuzzy system data transmit-and-receive unit 1b having the construction of FIG. 2 which receives such compiled message from the unit 1a. Upon receiving the message 20 (step n21), the code representing the inference type is read out (step n22) to be stored into the memory 13 (step n23). In step n24, the membership functions are respectively decoded. The decoded membership functions are stored into the memory 12 corresponding to the respectively accompanied labels (step n25). After repeating the sequence from n24 to n25 to finish reading the membership functions (step n26), a fuzzy rule is decoded (step n27) and decompiled into an actual fuzzy rule by the parameters (step n28). The decompiled rule is stored into the memory 14 (step n29). If the operation about all rules is finished, the sequence is finished (step n30). Thus, the fuzzy data employed in the computer 2a is transferred into the other computer 2b for common use.

In this embodiment, the steps n3 to n6 labels membership functions to be compiled to a message, the steps n7 to n10 rewrite fuzzy rules into combinations of labels to be compiled to a message, the communication controller 16 and step n12 transmit a complete message, the steps n24 to n26 decode membership functions from the transmitted data to be stored, and the steps n27 to n30 decompile fuzzy rules from the received message and the stored labels to be stored. The transmit-and-receive unit 1b also may transmit the above-mentioned fuzzy data to the unit 1a connected to the computer 2a.

Thus, according to this embodiment, since the fuzzy rule deciding a procedure of inference is represented by a combination of labels to be transmitted, the fuzzy data employed in a first fuzzy inference device can be easily transmitted to a second fuzzy inference device, so that the first and second devices to control the same object can commonly have fuzzy data and the control in the system can be improved with a simplified construction.

It should be understood that this invention can be applied to the system having more than two stations (1a-2a, 1b-2b).

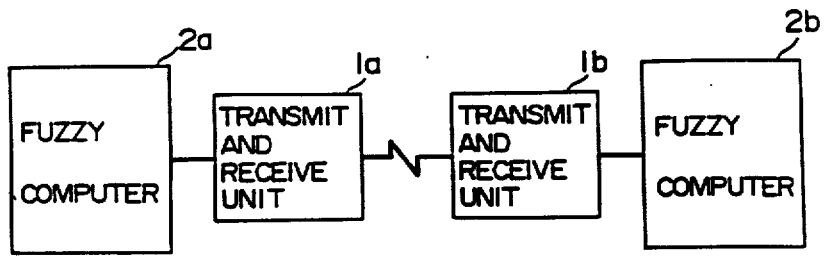

What is claimed is:

1. A fuzzy data communication system comprising first inference means for implementing a first fuzzy inference,
    second inference means for implementing a second fuzzy inference, and
    communication means for transmitting fuzzy data employed in said first inference means into said second inference means to be employed by the second inference means.

2. A fuzzy data communication system according to claim 1, wherein said fuzzy data include a fuzzy rule and a membership function.

3. A fuzzy data communication system according to claim 1, wherein said second inference is implemented by the second inference means based on said transmitted fuzzy data.

4. A fuzzy data communication system according to claim 1, wherein said communication means includes first means for transmitting a plurality of membership functions each having a label and second means for transmitting a combination of labels representing a fuzzy rule.

5. A fuzzy data communication method comprising the steps of
    designating a plurality of membership functions with individual labels,
    representing a fuzzy rule by a combination of said labels, and
    transmitting said labeled membership functions and said represented fuzzy rule.

6. A fuzzy data transmitter comprising means for compiling into message a plurality of membership functions individually labeled,
    means for compiling into message a fuzzy rule by a combination of labels, and
    means for transmitting said message.

7. A fuzzy data receiver comprising
    means for storing membership functions read from a received message corresponding to labels, and
    means for decompiling a fuzzy rule based on the received message and the stored labels to be stored.

* * * * *

UNITED STATES PATENT AND TRADEMARK OFFICE
CERTIFICATE OF CORRECTION

PATENT NO. : 4,961,225

DATED : October 2, 1990

INVENTOR(S) : Atushi Hisano

It is certified that error appears in the above-identified patent and that said Letters Patent is hereby corrected as shown below:

The title page should be deleted to appear as per attached title page.

Signed and Sealed this

Second Day of March, 1993

Attest:

STEPHEN G. KUNIN

*Attesting Officer*    Acting Commissioner of Patents and Trademarks

United States Patent [19]

Hisano

[11] Patent Number: 4,961,225
[45] Date of Patent: Oct. 2, 1990

[54] FUZZY DATA COMMUNICATION SYSTEM
[75] Inventor: Atsushi Hisano, Nagaokakyo, Japan
[73] Assignee: Omron Tateisi Electronics Co., Kyoto, Japan
[21] Appl. No.: 413,097
[22] Filed: Sep. 27, 1989
[30] Foreign Application Priority Data
  Sep. 29, 1988 [JP] Japan .................. 63-244968
[51] Int. Cl.$^5$ .................. H04K 1/00; G06G 7/00
[52] U.S. Cl. .................. 380/28; 364/513; 364/807; 364/274.6
[58] Field of Search .......... 380/28; 364/513, 807, 364/274.6, 200
[56] References Cited
  U.S. PATENT DOCUMENTS

| | | | |
|---|---|---|---|
| 4,694,418 | 9/1987 | Ueno et al. | 364/807 |
| 4,716,540 | 12/1987 | Yamakawa | 364/807 |
| 4,777,585 | 10/1988 | Kokawa et al. | 364/513 |
| 4,837,725 | 6/1989 | Yamakawa | 364/807 |
| 4,839,823 | 6/1989 | Matsumoto | 364/513 |
| 4,860,214 | 8/1989 | Matsuda et al. | 364/513 |
| 4,860,243 | 8/1989 | Ueno et al. | 364/807 |
| 4,875,184 | 10/1989 | Yamakawa | 364/807 |

*Primary Examiner*—Salvatore Cangialosi
*Attorney, Agent, or Firm*—Dickstein, Shapiro & Morin

[57] ABSTRACT

A fuzzy data communication system includes a first fuzzy computer storing fuzzy functions and rules, a transmitter compiling the fuzzy functions and rules stored in the first computer into a message to transmit the message, a receiver receiving the transmitted message to decompile fuzzy functions and rules from the received message, and a second fuzzy computer implementing a fuzzy inference based on the decompiled fuzzy functions and rules.

7 Claims, 4 Drawing Sheets